Nov. 22, 1938.           R. POLK, SR., ET AL           2,137,414
                  METHOD OF EXTRACTING FRUIT JUICES
                        Filed June 3, 1937
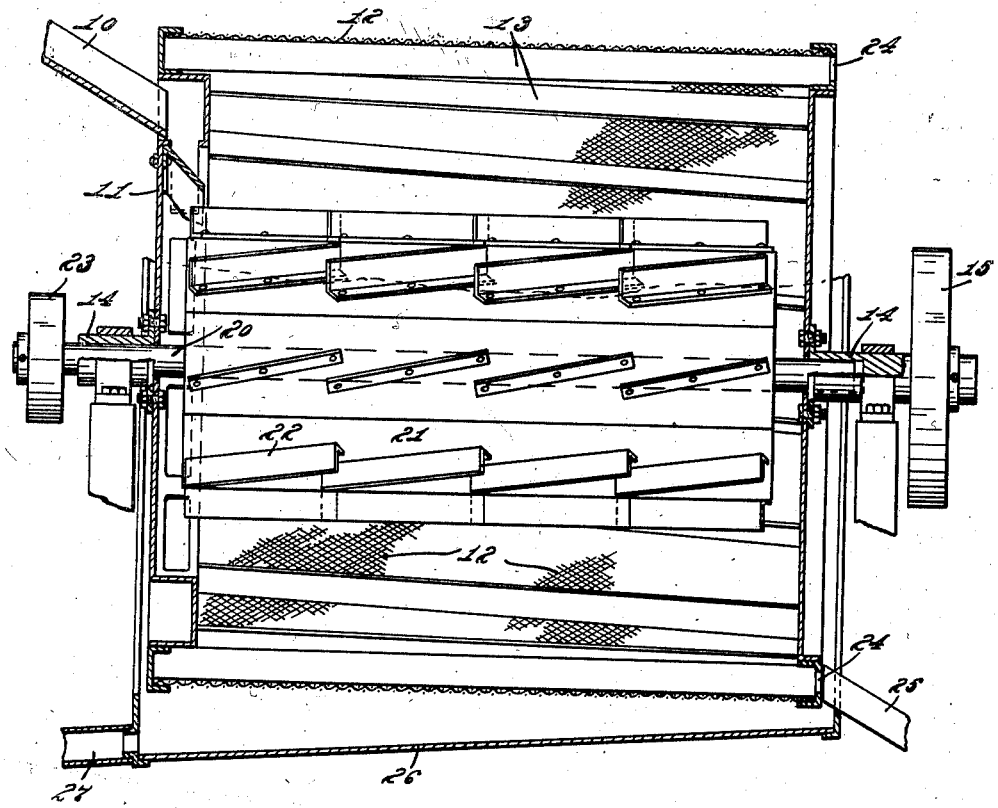
INVENTORS.
Ralph Polk Sr. and
BY   Ralph Polk Jr.,
     Hood & Hahn.
            ATTORNEYS.

Patented Nov. 22, 1938

2,137,414

UNITED STATES PATENT OFFICE 2,137,414

METHOD OF EXTRACTING FRUIT JUICES

Ralph Polk, Sr., Miami, and Ralph Polk, Jr., Haines City, Fla.

Application June 3, 1937, Serial No. 146,166

1 Claim. (Cl. 146—219)

The object of our invention is to provide an improved method and means for extracting fruit juices, more particularly the juices of citrus fruits, in such manner that the extracted juice will be substantially free of the bitter juices carried in and upon the integuments of the fruit.

The accompanying drawing is an axial section of our improved apparatus, by means of which our improved method may be practiced.

We have found that, when the integuments of citrus fruit are subjected to a rubbing or pressing action for the purpose of breaking the juice containing cells and extracting the juice therefrom, the extracted juice contains an objectionable bitter constituent which is derived from the integuments, but that if the juice containing cells are ruptured by impact and juice drained from the debris without substantial rubbing or pressing, a much higher grade of juice, lacking the aforesaid bitter constituent, is obtainable.

In the mechanical production of integument-free segments of citrus fruit, particularly of grapefruit, the major portion of the external skin or rind is removed and preferably the subjacent peripheral portions of the segmental integuments are also removed as a preliminary to the removal of the whole segmental groups of unruptured juice cells and in this operation several of the segmental groups of cells of each fruit are left untouched or partially broken so that the débris, comprising the core and radiating segment integument walls, carries a considerable volume of fruit juice which, heretofore, has generally been discarded because of the accompanying bitter constituent of the juices extracted by rubbing or pressure.

According to our present invention, this juice carrying débris is delivered through a spout 10 into a rotating drum 11 having a screen periphery 12 and inwardly projecting forwarding flights 13. The drum 11 is supported by hollow shafts 14, 14 and driven, at a relatively low speed, by any suitable means as through the medium of pulley 15. Journaled in hollow shafts 14, 14 is a shaft 20 extending through drum 11 and carrying, within the drum, an octagonal beater drum 21 on the faces of which are carried angularly set beater flights 22. The beater drum 21 is rotated at relatively high speed by any suitable means as through the medium of pulley 23. One head of drum 11 is perforated circumferentially at 24 to permit the débris, forwarded by flights 13, to discharge into a waste chute 25.

Subtending drum 11 is a juice trough 26 provided with an outlet conduit 27.

Drum 21 being rotated at relatively high speed and drum 11 being rotated at relatively low speed, the juice bearing fruit elements are delivered into drum 11 through trough 10 and, falling therefrom, are batted by the flights 22 so as to strike screen 12. They then fall or are carried to the lower part of drum 11 and, by flights 13 elevated to again fall from flights 13 into the path of movement of the batting flights 22, this operation being repeated as the material is forwarded, by reason of the inclination of the flights 13, to ultimately emerge from drum 11 through perforations 24.

The speed of rotation of drum 11, may, if it is desired, be sufficient to develop some centrifugal force in the juice to cause it to pass through screen 12 but must be low enough to permit the materials to drop from the upper region of the drum 11 into the path of the beater flights 22.

While whole peeled citrus fruits may be treated in the manner above described, our apparatus and method are primarily designed for the handling of partially desegmented fruits.

We claim as our invention:

The method of extracting juice from citrus-fruit juice-cells dissociated from peel but associated with inedible integuments which consists in repeated batting of freely-falling juice-cell-integument masses, propelling the masses out of the zone of the batting action collecting the masses and straining the juices therefrom, returning the masses and dropping them into the batting zone for further batting.

RALPH POLK, Sr.
RALPH POLK, Jr.